United States Patent
Giloh et al.

(10) Patent No.: US 9,545,755 B2
(45) Date of Patent: Jan. 17, 2017

(54) APPARATUS FOR PRODUCING A NONWOVEN PRODUCT IN A NON-INDUSTRIAL ENVIRONMENT

(71) Applicant: TamiCare Ltd., Heywood (GB)

(72) Inventors: Tamar Giloh, Heywood (GB); Ehud Giloh, Heywood (GB); Reuven Melamed, Zikhron Ya'akov (IL)

(73) Assignee: Tamicare Ltd., Heywood (GB)

( * ) Notice: Subject to any disclaimer, the term of this patent is extended or adjusted under 35 U.S.C. 154(b) by 410 days.

(21) Appl. No.: 14/211,758

(22) Filed: Mar. 14, 2014

(65) Prior Publication Data

US 2014/0271966 A1    Sep. 18, 2014

Related U.S. Application Data

(60) Provisional application No. 61/788,370, filed on Mar. 15, 2013.

(51) Int. Cl.
*B29C 67/00* (2006.01)
*D04H 1/00* (2006.01)
*D04H 1/70* (2012.01)
*D04H 1/655* (2012.01)

(52) U.S. Cl.
CPC ....... *B29C 67/0081* (2013.01); *B29C 67/0088* (2013.01); *D04H 1/00* (2013.01); *D04H 1/655* (2013.01); *D04H 1/70* (2013.01)

(58) Field of Classification Search
CPC ................................................ B29C 67/0081
See application file for complete search history.

(56) References Cited

U.S. PATENT DOCUMENTS

| | | | |
|---|---|---|---|
| 5,936,861 A | 8/1999 | Jang et al. | |
| 2004/0005374 A1* | 1/2004 | Narang | B29C 67/0092 425/375 |
| 2004/0039371 A1 | 2/2004 | Tockman et al. | |
| 2004/0124146 A1 | 7/2004 | Dao et al. | |
| 2006/0113714 A1* | 6/2006 | Giloh | B29C 33/46 264/517 |

FOREIGN PATENT DOCUMENTS

| | | |
|---|---|---|
| DE | 10 2009 015791 A1 | 9/2010 |
| WO | 2011/026563 A1 | 3/2011 |

OTHER PUBLICATIONS

PCT International Search Report and Written Opinion, International Searching Authority, Sep. 24, 2015, pp. 1-6 for International Application No. PCT/IB2014/001421.

* cited by examiner

*Primary Examiner* — Timothy Kennedy
(74) *Attorney, Agent, or Firm* — McDonnell Boehnen Hulbert & Berghoff LLP

(57) ABSTRACT

An apparatus for producing a non-woven product is disclosed. The apparatus is located substantially within an enclosure and includes a mold or former and at least two moveable material application heads. A controller controls various elements located within or connected to the enclosure. The footprint of the enclosure is smaller than 2 m×2 m.

10 Claims, 2 Drawing Sheets

APPARATUS FOR PRODUCING A NONWOVEN PRODUCT IN A NON-INDUSTRIAL ENVIRONMENT

CROSS-REFERENCE TO RELATED APPLICATIONS

This application is a non-provisional of U.S. Ser. No. 61/788,370 filed on Mar. 15, 2013, the contents of which are fully incorporated by reference herein.

BACKGROUND

A small scale printer for 3D product printing is relatively new but a well known process. It features a very desired customization level for products and easy access to producing products "at home" with its added convenience and independency. The nonwoven industry usually employs full scale, very large machines for regular production of nonwoven disposable products such as diapers, etc. The massive quantities of products used by individuals and the different desired and required specs create the need for a small scale production system, for home usage and for institutional usage (hospitals, home-care, children garden, army, space ship etc.). There is also a growing interest in the field of home printing, and the possibility of printing cloths for regular daily use is something people are looking for.

SUMMARY

This application discloses producing a nonwoven article at a non-industrial environment. The main difference in the production method of this invention to the method currently used in industrial production lines for nonwoven products is in that the invention introduces a neat aesthetic small footprint enclosed apparatus where products are produced typically in a relatively small output without departing outside the limited boundaries of the SOHO (Small Office Home Office) scale enclosure.

The apparatus incorporates different static and moving parts for the application of product materials, such as polymers in a liquid and loose textile fibers, and the production is executed mainly one step at a time and the different material application units do not work simultaneously, but generally one after the other sequentially.

In one embodiment, an apparatus for small scale production of nonwoven products is disclosed. The apparatus includes an enclosure, a former located within the enclosure, a controller mounted to the enclosure, at least two moveable appliance heads located within the enclosure, the at least two moveable appliance heads being controlled by the controller, at least one container for polymers mounted to the enclosure and connected to one of the moveable appliance heads, at least one container for fibers mounted to the enclosure and connected to the other moveable appliance heads, and a curing system. The footprint of the enclosure is smaller than 2 m×2 m.

DESCRIPTION

An apparatus for producing nonwoven products in a non-industrial environment is disclosed, the apparatus comprising a mold on which the product materials are layered and built (or printed, in an additive manufacturing process), layer by layer. Primarily, polymers in a latex form (suspension or emulation) and loose textile fibers are applied in a desired sequence and at specific zones on top of the mold surface, according to the product structure and specifications, and cured (by polymerization of the polymer) to create a non-woven fabric and product. A motorized moving 'appliance' head/s is used for applying different liquid based materials and polymers, motorized movable fibers flocking head/s or unit/s, polymer curing system heating or drying elements or water evaporation system, material storage containers, etc.

In this application the term 'mold' or 'mould' is interchangeable with the term 'former' and with the term 'production surface'.

In this application the term 'appliance head' is interchangeable with the term 'material application unit or gun'.

The apparatus is a contained structure having substantially all of its components and parts located within a single enclosure, with aesthetics similar to a SOHO paper printer or 3D printer, creating a pleasant, appealing and user friendly machine and gadget.

Figure 1:
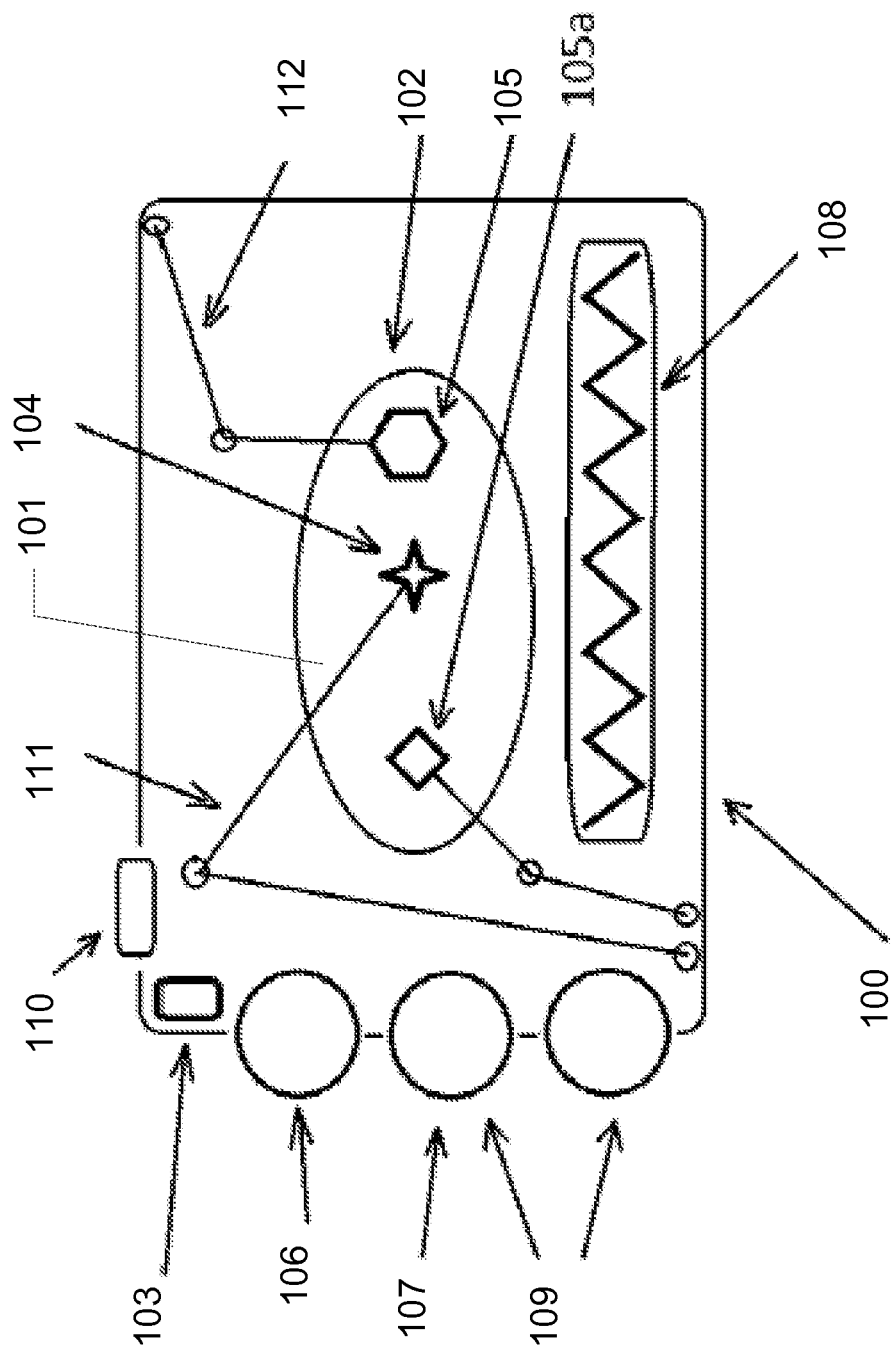
FIG. 1 shows a top view of an example apparatus of the present application.

Referring to FIG. 1, an enclosure 100 is provided. The enclosure 100 contains at least one former, production surface, or mold 102, and the fabric film created on top of the mold substantially conforms to the shape of the mold so that a shape of the mold largely define the shape of final product made by the apparatus. The former 102 includes an outer surface 101. The enclosure also includes a controller 200 incorporated therein for controlling various elements located within or connected to the enclosure.

The enclosure 100 further includes at least one moveable material application head or unit in the form of a liquid polymer spray nozzle 104. The movable spray nozzle 104 may be mounted on a motorized moving arm 111. The moving arm 111 may be any moving arm as know in the art, such as but not limited to XY table, XYZ system or any other suitable moving mechanism. The moving arm 111 is operated by the controller 200, moving the material application head 104 alongside the outer surface 101 of the former 102 in correlation with data received by the controller 103. The moving arm(s) or mechanism 111 is designed to move the material application heads ('printing' heads) 104, 105 according to the desired location and trajectory, alongside the surface 101 of the mold 102.

A suitable spray nozzle 104 or sprayer system may include, without limitation, air assisted based, airless based, electrostatic-based sprayers. The spray nozzle or sprayer system may further include spray guns, compressors, pressure tanks, pressure regulators, feeding pipes and other components known in the art for spraying liquid polymers, elastomers such as latex, and other like materials.

The spray nozzle 104 may include a variety of controllable parameters. Examples of the parameters include, but are not limited to, amount of liquid material delivered as a function of time, fan pattern, direction, controlled material atomization, and spray gun activation. The parameters for spray operation may be set automatically or manually. If set automatically, the parameters may be determined by accessing the memory which stores the parameters for operation of the sprayer. Based on this determination, the memory may be accessed to set the parameters for the sprayer based on the aspects of the product so that further operation steps such as additional spraying of product material bands or layers at specific regions of the initial product for thickening or reinforcement may be performed.

The enclosure also includes another material application head in the form of a fiber flocking unit 105, the flocking unit also being operated by the controller 200. The fiber flocking unit 105 is located within the enclosure 100 and is mounted on a second motorized, movable arm or mechanism 112, or on the same movable arm or mechanism, 111.

The enclosure also includes at least one container 106 for holding polymer and in connection with the spray nozzle 104. The container 106 may be connected to a pump and/or to the spray nozzle 104 by tubing for example. Other connection means are also possible. The polymers are sprayed onto the mold 102 through the spray nozzle 104. The enclosure 100 may further include at least one container 107 for containing loose fibers to be flocked. The container 107 is connected to the fiber flocking unit 105, such as by tubing for example. Other connection means are also possible. The loose fibers are flocked onto the mold 102 by the fiber flocking unit 105. The polymer and/or the loose fiber containers 106 and 107 may be replaceable cartridges. Although the apparatus is substantially enclosed, the material storage containers 106 and 107 may be located within the enclosure, slightly outside or partly outside of it, or underneath it to allow for easy replacement and handling.

The enclosure 100 may also include a curing system 108 for curing the polymers on the mold 102. The curing system 108 may be located within the enclosure 100. The curing system 108 may be induced by heat using UV or incandescent light or a heating coil, blowing hot air, or through a chemical reaction, or by suitable IR radiation or by any other suitable method.

In another embodiment, the enclosure 100 may contain a set of fiber cartridges 109, as a replacement for containers 106 and/or 107, and each cartridge may contain fibers of different nature, length, width (Decitex), and color.

Examples of fiber materials may be viscose, cotton, polyamide, polyester, silk, wool, or any other suitable fiber.

Figure 2:
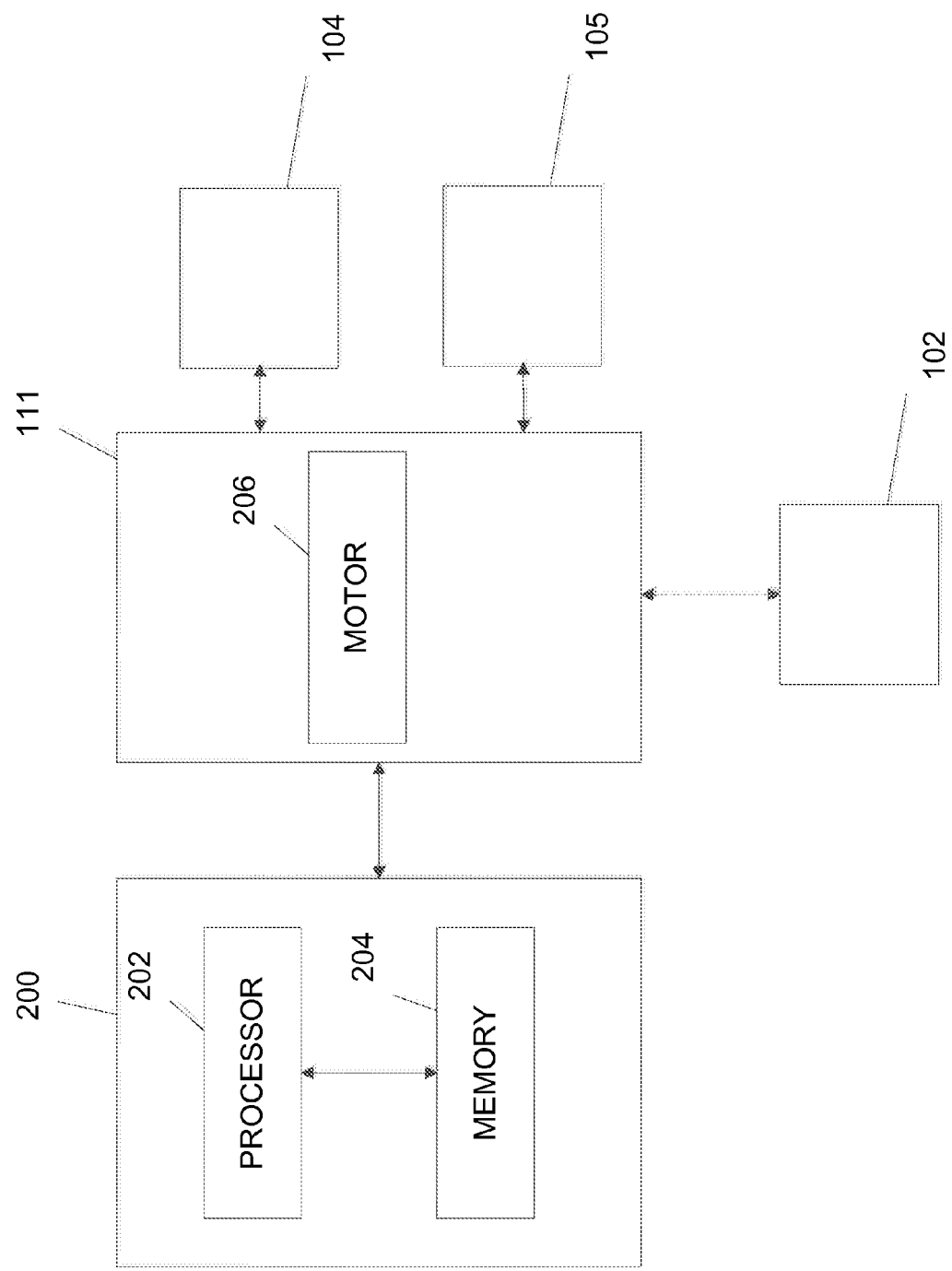
FIG. 2 is a block diagram of one embodiment of the apparatus.

Referring to FIG. 2, a representative block diagram of the system is shown. The controller 200 controls the operation of the system. Examples of a controller include, but are not limited to, a computer, a terminal, a workstation, or some other electronic device capable of controlling the operation of the moveable arms 111 and the former 102. The moveable arms 111 each include at least one motor 208 for moving components connected to the arms, i.e., the spray nozzle 104 and the flocking unit 105. The controller 200 includes a processor 202 and a memory 204. The processor 202 may comprise a microprocessor, a microcontroller, or any device which performs arithmetic, logic or control operations. The memory 204 may include any suitable memory device such as non-volatile memory devices such as a ROM, or magnetic or optical memory. The memory 204 may also include volatile memory devices such as a RAM device. Software may be included for the controller 200 to control components within the system, such as the arms 111, the flocking unit 105, and former 102.

The apparatus may also comprise other components such as pumps, pressure regulators, a high voltage generator for electrostatic fibers flocking or for electrostatic liquid polymer spraying, brushes, an adhesive or hot melt applicator and a seaming tool to close a flat product into a sleeve shaped or partially sleeved product, and additional material/s or object/s applicator, 105a such as sanitary pad applicator, a nonwoven sheets applicator, a decoration applicator, perfume or other liquids applicators, those material/s or object/s applicators may be movable in a controlled manner by the controller to apply the material/s or object/s at any desired location or zone of the former surface. The apparatus may also include a vision system, a numeric printer, a counter. These components may be attached to or contained within the enclosure 100. A user interface 110 may also be mounted on the enclosure 100. The user interface operates the controller 200. The user interface 110 may include push-buttons or a keyboard, and a display.

The footprint of the enclosure 100 is preferably smaller than approximately 2 m×2 m, and even more preferably smaller then approximately 1.5 m×1.5 m or even more preferably smaller than approximately 1 m×1 m.

The apparatus may produce the products according to a pre-set program, hence facilitating operation by a non-skilled operator. Design and production data and commands are generated by electronic media and may be transmitted to the apparatus via a digital interface.

In one embodiment, the former 102 may be fixed in place. In another embodiment, the former 102 may be motorized and moving during production to improve production process speed, efficiency or accuracy. However, the movement of the former 102 shall not generally exceed the size of the enclosure 100 or cause the former to depart from the enclosure.

In another embodiment, the material application heads 104, 105, 105a may be substantially static during the manufacturing process, so that at least most of the necessary relative movements, between the materials application heads 104, 105, 105a (any material application device within the enclosure) and the former are performed by movements of the former 102.

In yet another embodiment, some of the relative movements between the materials application heads and the former 102 are performed by movement of at least some of the material applications heads, and some relative movements are performed by moving of the former.

In yet another embodiment, the former 102 may be removed, manually or automatically, from the apparatus, after the product is substantially created, allowing convenient removal of the finished product from the former.

The apparatus of the present application may be used to produce products such as lingerie, sportswear, swimwear, sanitary napkins, diapers, medical dressing, cosmetic masks, sanitary underwear or any other desired garment or product. The apparatus may be also used to produce regular nonwoven clothing, such as underwear, tights, shirts, sportswear etc. The products produced in the apparatus may include the technology and materials introduced by TamiCare ltd in, for instance, U.S. Pat. Nos. 7,354,424; 7,901,740; 7,700,030; and 8,323,764; U.S. Pub. Patent application nos. 2009/0131902, all incorporated by reference in its entirety, but are not limited to this technology and products only.

The apparatus may also comprise a unit for adding on an absorbent device such as a hygiene pad. See, for instance, U.S. Design Pat. No. D595,844 and U.S. Patent publication no. 2010/0106124, which is incorporated by reference in its entirety.

We claim:

1. An apparatus for small scale production of nonwoven products, the apparatus comprising:
    an enclosure;
    a former located within the enclosure;
    a controller mounted to the enclosure;
    at least two moveable appliance heads located within the enclosure, the at least two moveable appliance heads being controlled by the controller;
    at least one container for polymers mounted to the enclosure and connected to one of the at least two moveable appliance heads, said one of the at least two moveable appliance heads comprises a spray nozzle for spraying said polymers;

at least one container for fibers mounted to the enclosure and connected to the other of the at least two moveable appliance heads, wherein said other of the at least two moveable appliance heads comprises a fiber flocking unit; and a curing system;

wherein the footprint of the enclosure is smaller than 2 m×2 m.

2. The apparatus according to claim 1 wherein the footprint of the enclosure is smaller than 1.5 m×1.5 m.

3. The apparatus according to claim 1 wherein the footprint of the enclosure is smaller than 1 m×1 m.

4. The apparatus according to claim 1 wherein the former is fixed in place.

5. The apparatus of claim 1 wherein the former is motorized and moving, and wherein the movement of the former does not exceed the size of the enclosure.

6. The apparatus according to claim 1 wherein the former can be removed from the apparatus.

7. The apparatus of claim 1 wherein the enclosure further comprises a set of fiber cartridges.

8. The apparatus of claim 1 wherein the enclosure further comprises a user interface.

9. The apparatus of claim 1 wherein the at least two moveable appliance heads are mounted on a moveable arm or mechanism.

10. The apparatus of claim 1 wherein said one of the at least two moveable appliance heads is mounted on one moveable arm or mechanism, and said other of the at least two moveable appliance heads is mounted on a second moveable arm or mechanism.

\* \* \* \* \*